June 2, 1970     D. M. GREY ET AL     3,515,291
BALE WAGON HAVING SINGLE BALE UNLOADING MEANS
Filed May 16, 1968     9 Sheets-Sheet 1
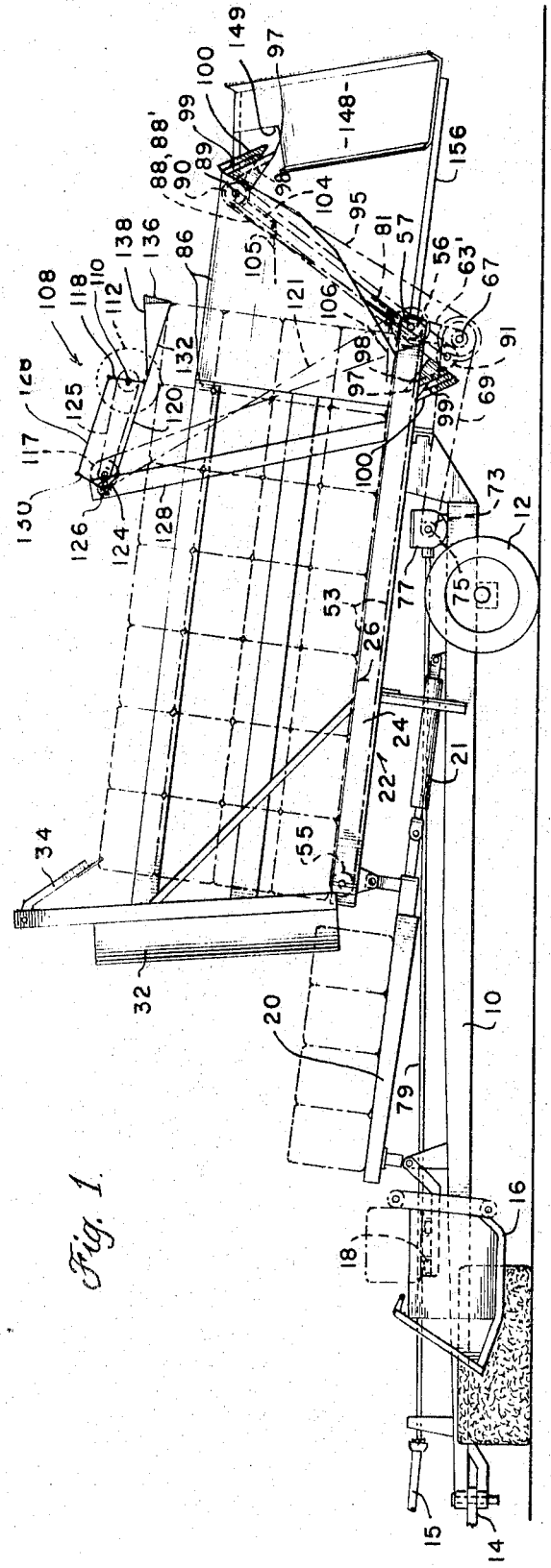
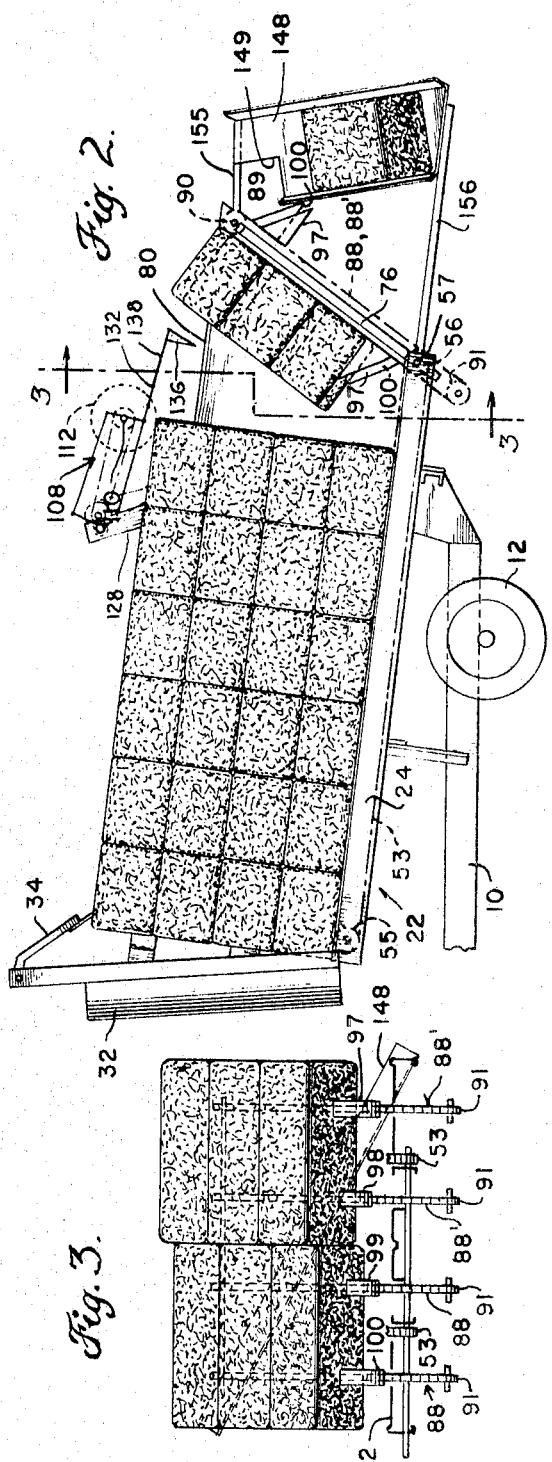
INVENTORS
DONALD M. GREY
LEE D. BUTLER
& JERRY W. WELKER
BY John E. Becker
ATTORNEY

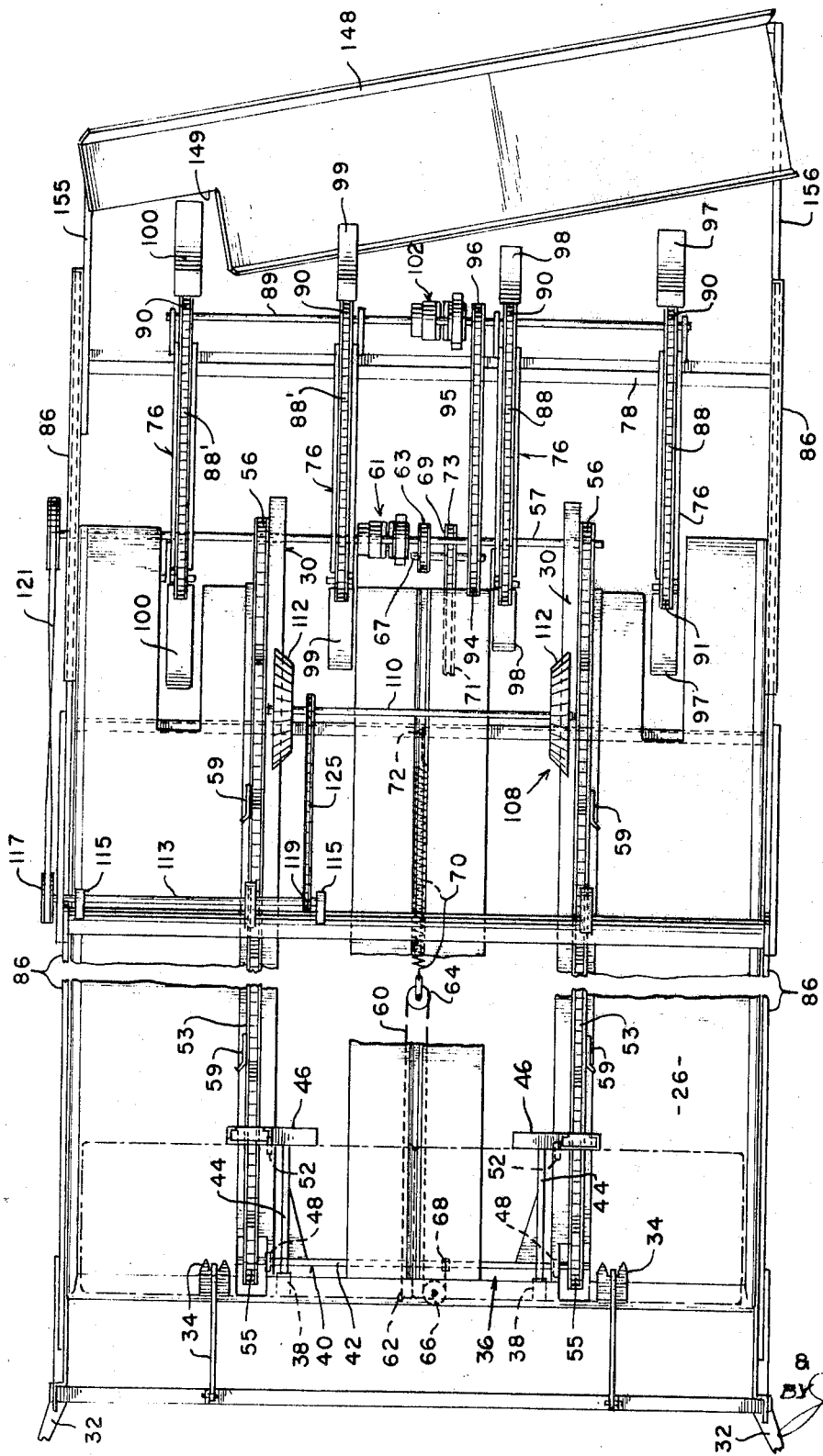

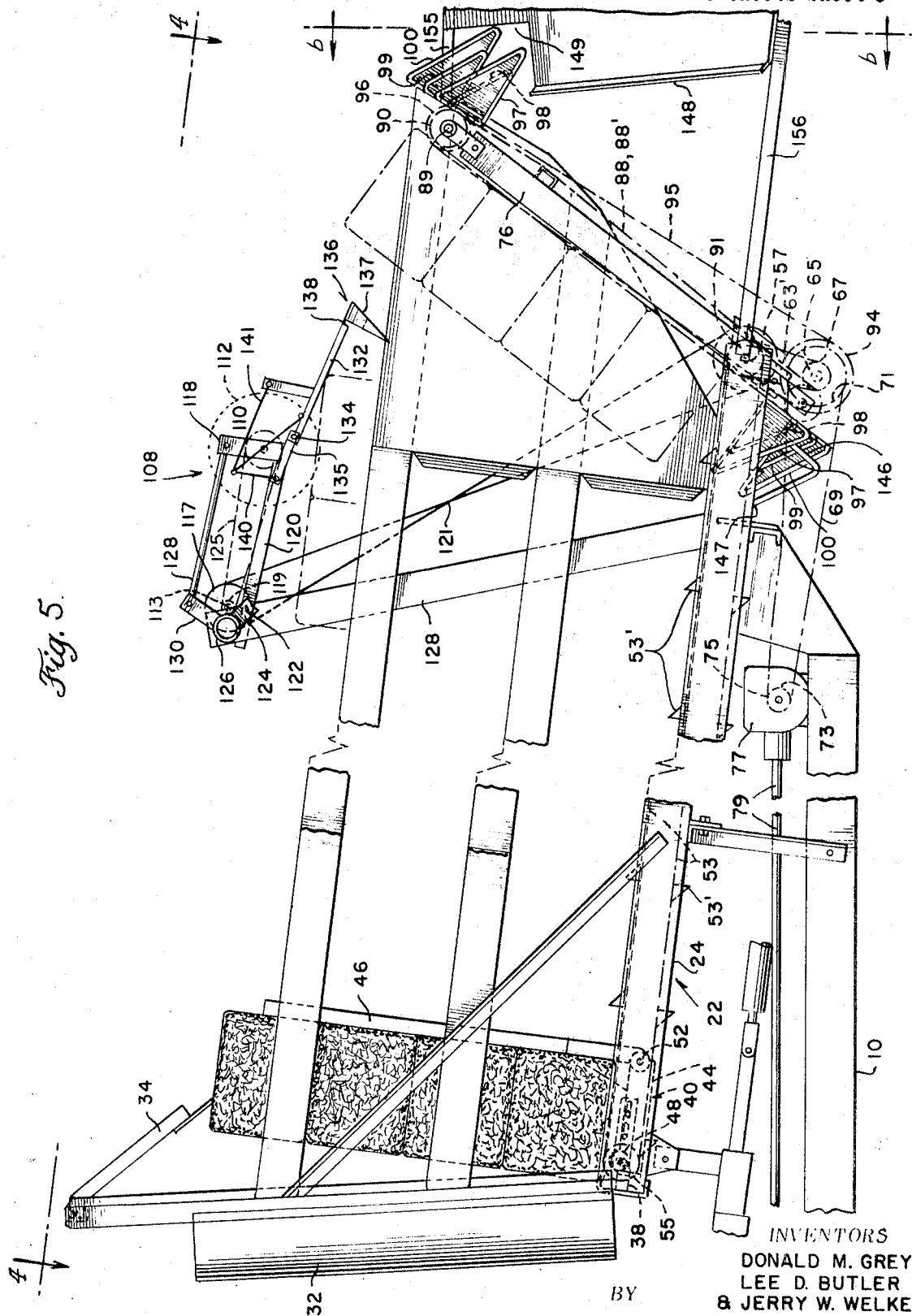

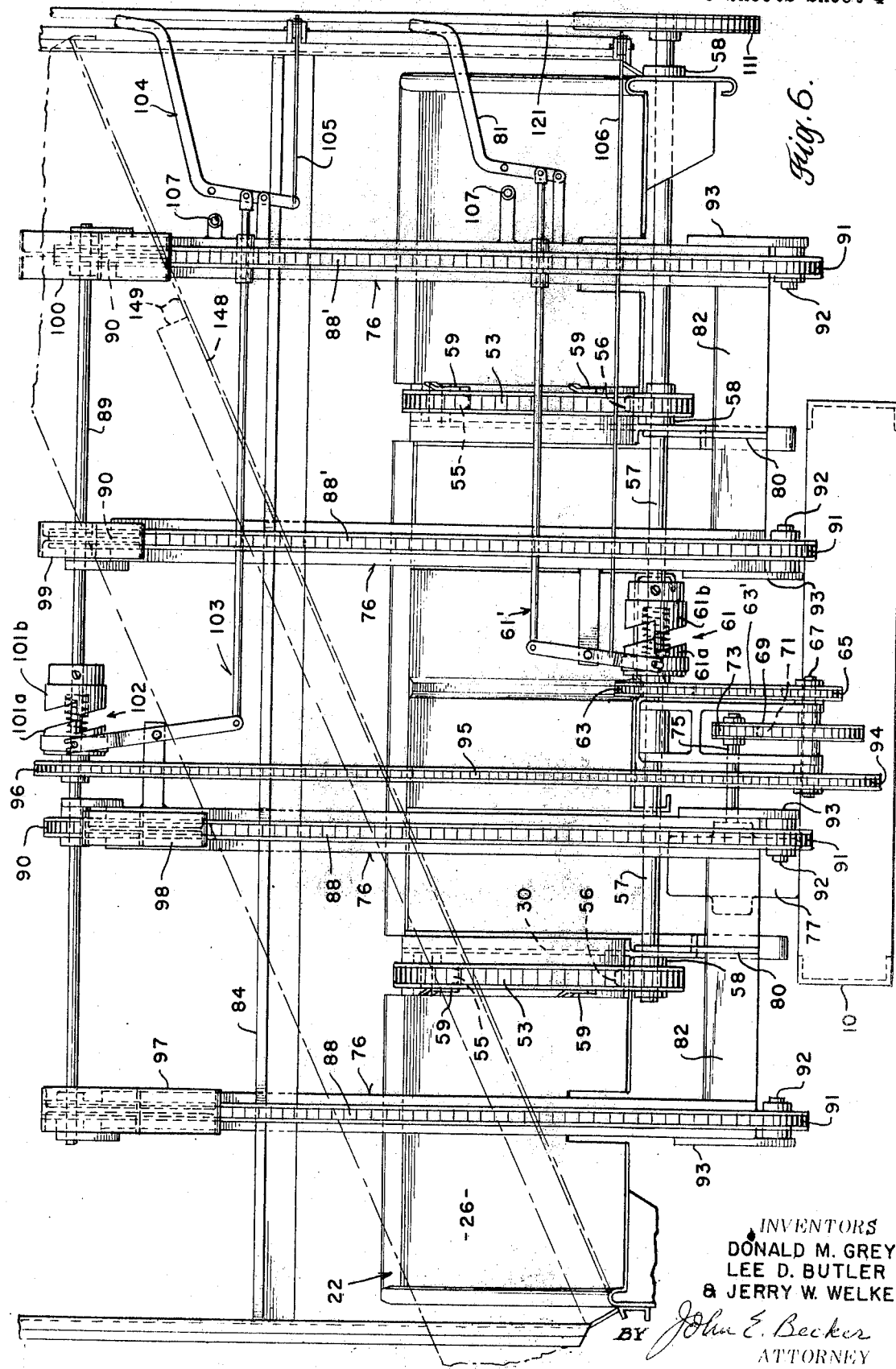

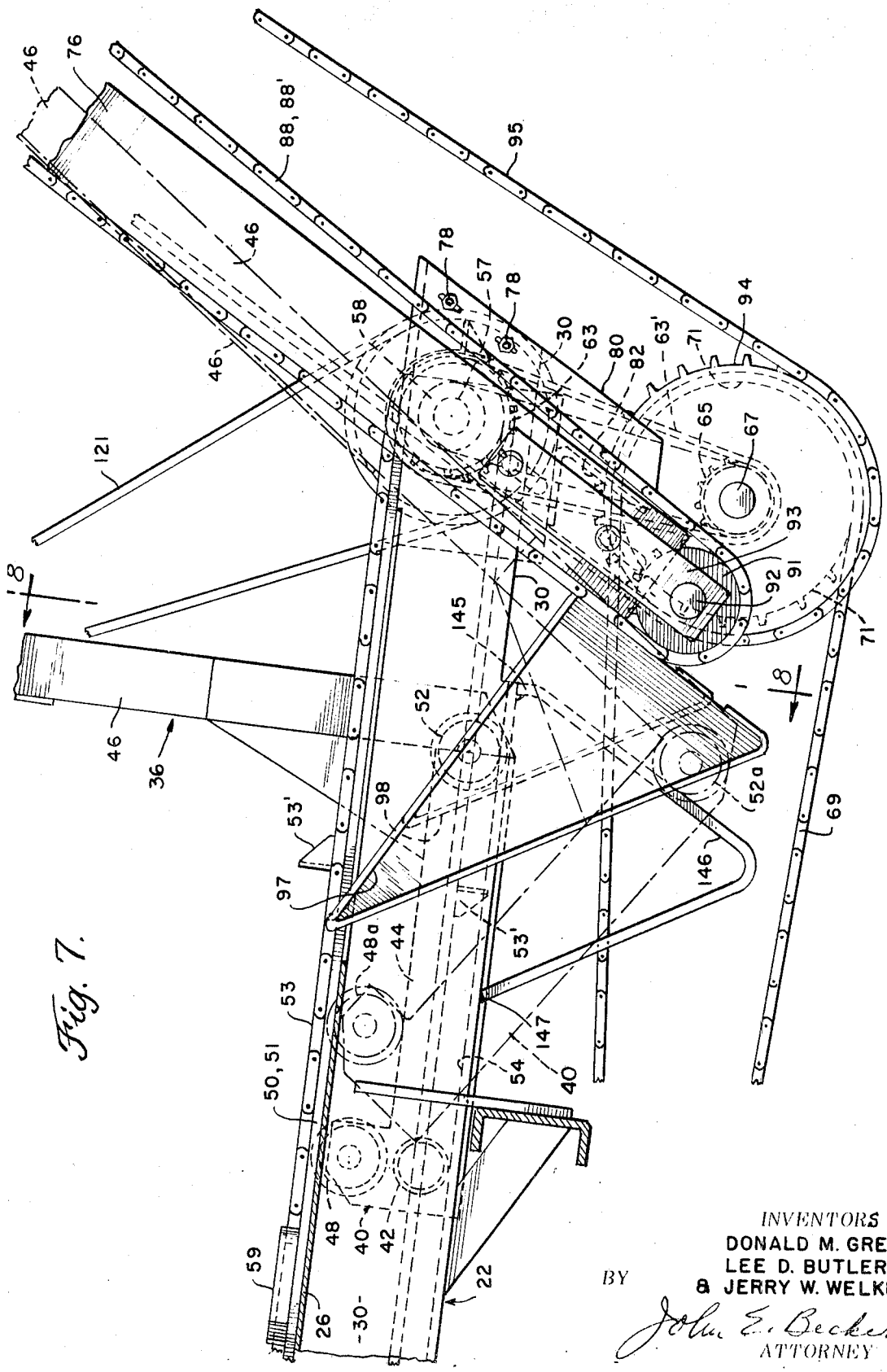

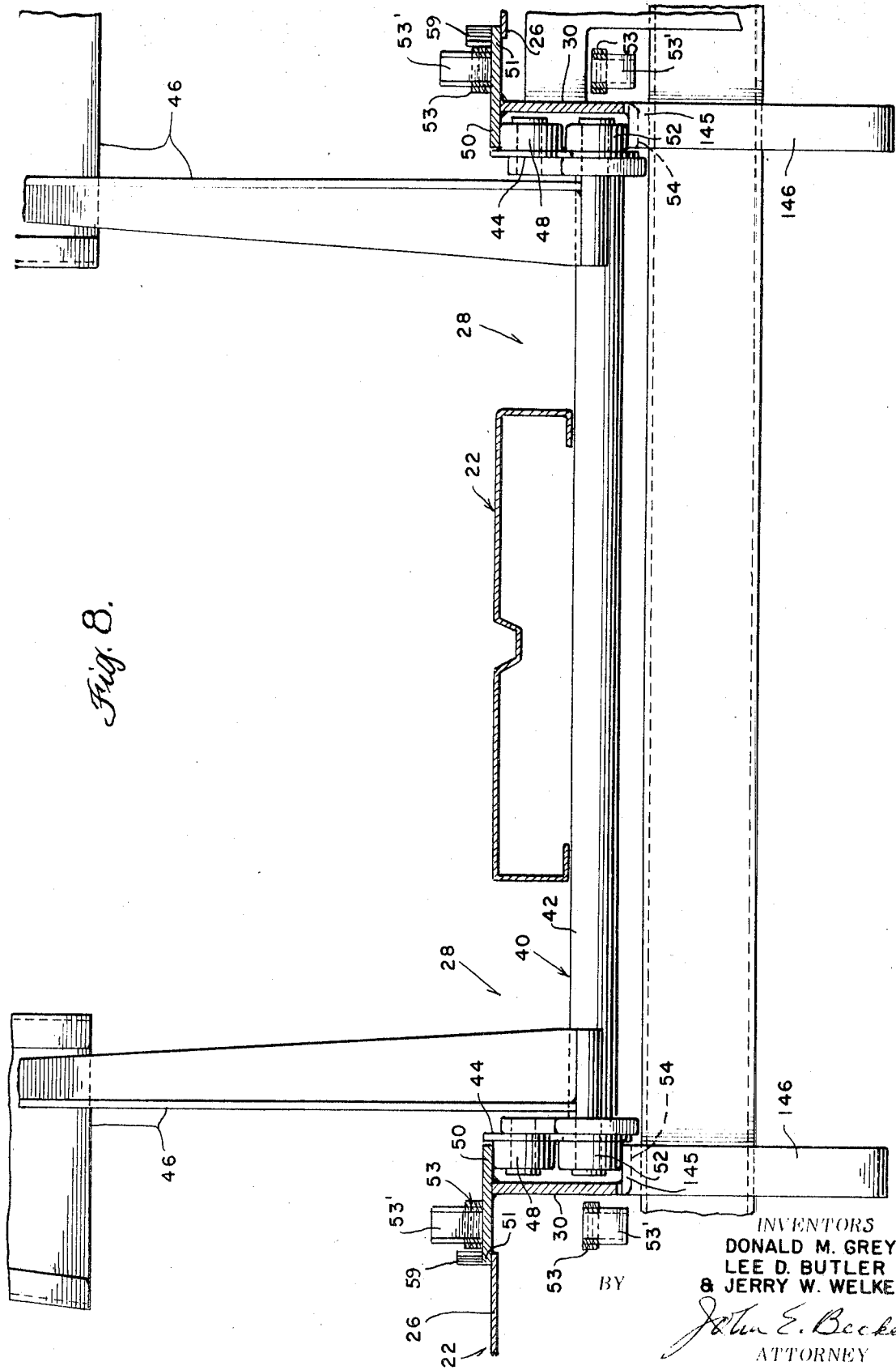

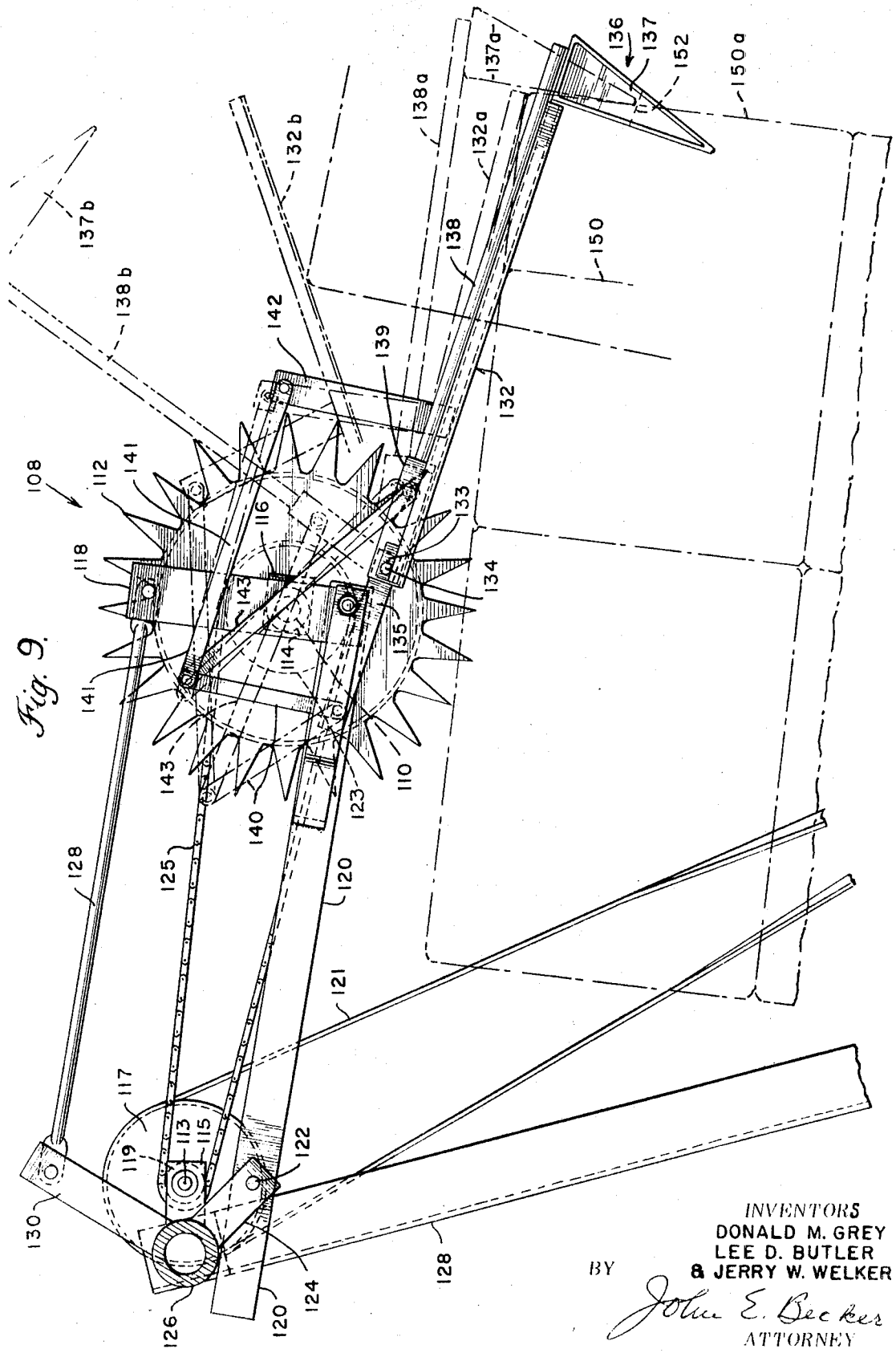

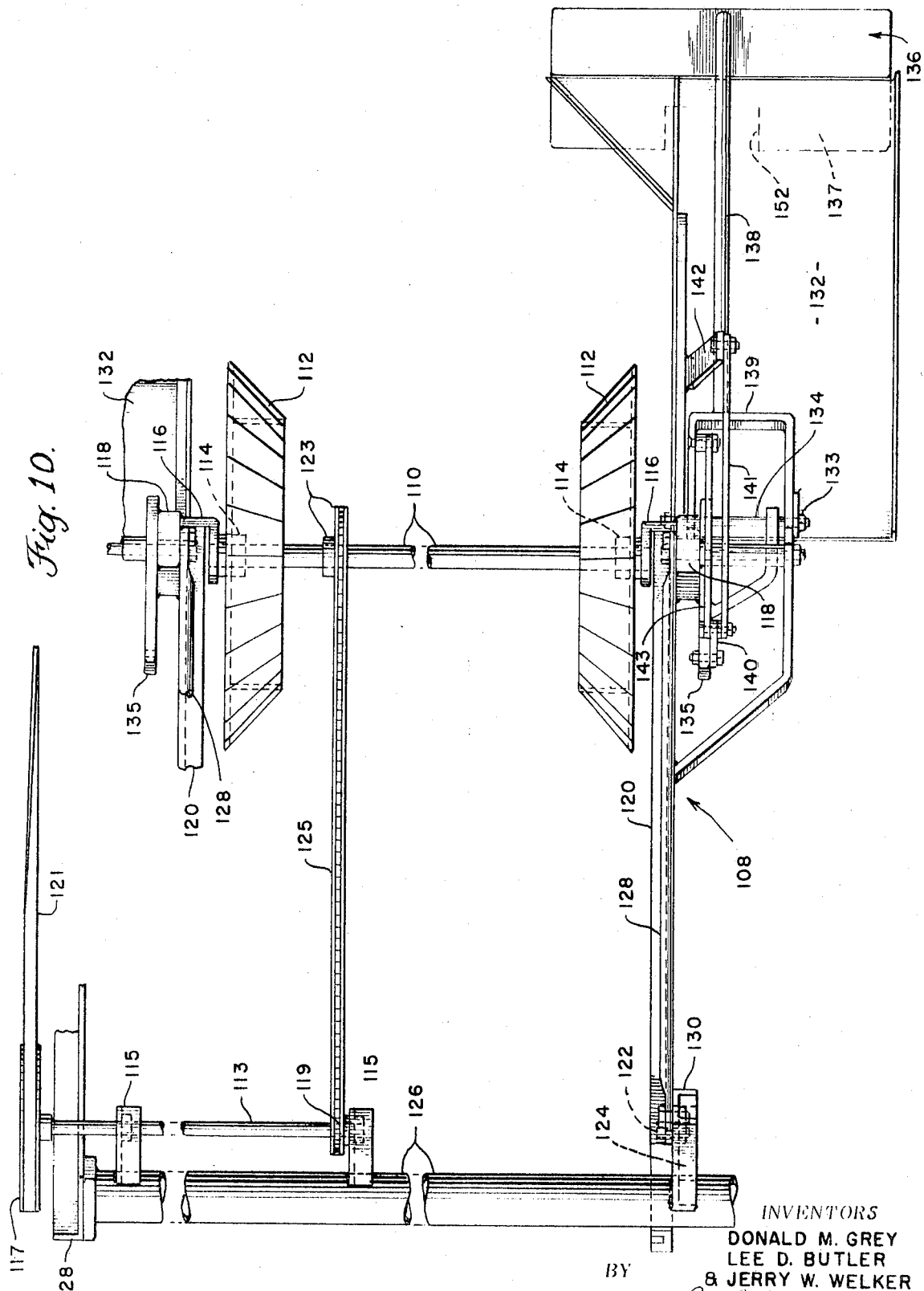

INVENTORS
DONALD M. GREY
LEE D. BUTLER
& JERRY W. WELKER
BY
John E. Becker
ATTORNEY United States Patent Office 3,515,291
Patented June 2, 1970

3,515,291
BALE WAGON HAVING SINGLE BALE UNLOADING MEANS
Donald M. Grey, Selma, Lee D. Butler, Kingsburg, and Jerry W. Welker, Selma, Calif., assignors to Sperry Rand Corporation, New Holland, Pa., a corporation of Delaware
Filed May 16, 1968, Ser. No. 729,686
Int. Cl. B66g 59/08
U.S. Cl. 214—6          17 Claims

ABSTRACT OF THE DISCLOSURE

A farm vehicle for carrying stacks of baled hay or the like and including apparatus for unloading the bale stacks one bale at a time.

BACKGROUND OF THE INVENTION

While agricultural technology relating to mechanized farm machinery has progressed substantially in recent years to make the farmer's job easier from the standpoint of performing manual labor and thereby enabling him to be more productive, certain aspects of the technology are lacking, for example with respect to the so-called automatic bale wagon which is a vehicle which has been developed in recent years to handle products such as baled hay and the like. Wagons of this type has been introduced which embody various automatic means for loading the baled product from the field onto the wagon and for unloading the complete load in a unit or stack, such as disclosed, for example, in the U.S. Pat. No. 2,848,127.

In the east, middle east, and some parts of the midwest it has been the practice to make relatively small bales, within the range of from 50 to 60 pounds, which could be readily handled manually without too much trouble. However, in the further middle and far western parts of the country, it has been the practice to make considerably larger size bales, in the range of 100 pounds and over, which bales are unwieldy and too heavy to be readily manually handled for variously storing, trucking, and shipping in commerce. Accordingly, the automatic bale loading and unloading wagon an example of which is disclosed in the U.S. Pat. No. 2,848,127, was developed to handle these bigger bales, due to shortage of labor and to the necessity for an automated means to expedite the handling of these larger baled products. Said patented wagon has proved to be very efficient and successful, particularly in the west where, due to the relatively drier climate, the practice is to store the hay outdoors in long, large stacks.

In more recent years, it has been become desirable in eastern parts of the country to evolve means for also automatically handling the smaller bales. In the east, hay is not stored outdoors in large stacks, due to the much wetter climate, but is stored in barns, with the storage of the baled hay often being effected manually and/or with the aid of conveyors which generally can handle the bales only one at a time in serial form.

Therefore, it is apparent that, in the farming and animal husbandry business, a need has evolved to provide means, of the general aforesaid kind, which will enable the bales to be unloaded in the single bale manner as onto a conveyor mechanism which will in turn convey them to storage facilities in a barn, or into feed mangers; or to provide means to discharge the bales singly and periodically throughout a livestock pasture area.

SUMMARY OF THE INVENTION

The means for achieving the single bale unloading includes the provision in combination of a wheeled frame having a generally flat support bed means for carrying bales thereon; means for depositing bales on said support bed, means on said support bed for receiving bales and to form them into vertically extending tiers; conveyor means on said bed for moving the tiers rearwardly to staggered means in association with a rearwardly inclined elevating conveyor for discharging the bales one bale at a time. This unloading means is intended solely to unload one bale at a time whereas the prior art bale wagons, such as said Grey U.S. Pat. No. 2,848,127 are intended to unload by the completed stack.

DESCRIPTION OF THE INVENTION

This invention relates to bale wagons which are intended to handle a variety of baled products such as baled hay or corn stalks and the like. More particularly, this invention relates preferably to bale wagons embodying automatic bale pickup means for picking up the preformed bales of hay from the field and loading them onto said wagon. One such wagon includes an automatic bale pickup and transfer means for depositing singly picked up bales usually in dual form upon a first receiving table or bed, said machine embodying automatic means for transposing the bales from the receiving bed onto a second or so-called transfer bed and further automatic means embodied therewith to transfer them onto the load-carrying bed, all of these beds being arranged in tandem upon a suitable chassis structure.

A primary object of the invention is to provide a bale wagon which incorporates selectively operable unloading device for single bale unloading of the wagon and operable either as the wagon is driven down a field or in a stationary manner at a transfer point from which the bales are unloaded, as onto a storage elevator or the like.

Another object of the invention is to provide a bale wagon of the aforedescribed character which embodies means disposed at the rearward end of the bale wagon for single bale unloading.

Still another object is to provide an improved wagon of the aforementioned character which embodies a single bale unloading means disposed adjacent the one end of the bale wagon and which includes means for discharging the bales in single bale fashion rearwardly and laterally of the wagon.

Yet another object is to provide single bale unloading means in conjunction with a bale wagon which embodies novel metering means disposed toward the rearward end of said bale wagon for metering the bales into a discharging area, and means to assure a uniform and positive transfer of the respective tiers of bales into the discharge area.

These and other objects will become more apparent from the following detailed description taken in conjunction with the illustrative drawings.

DESCRIPTION OF THE DRAWINGS

FIG. 1 is a side elevation of a single bale unloading wagon constructed in accordance with one preferred embodiment of the invention, and which shows the relative relationship of the principal components thereof;

FIG. 2 is a fragmentary side elevational view similar to FIG. 1 but showing the bales in the act of being unloaded;

FIG. 3 is a diagrammatic view looking rearwardly in the direction of the arrows 3—3 of FIG. 2, and illustrating the staggered unloading of the bales from the two stacks of a given tier of bales;

FIG. 4 is an enlarged fragmentary plan view of the load support bed or rack and associated stack conveyors, the star wheel stabilizing and metering unit, the bale elevators and discharge chute, as viewed substantially on the line 4—4 of FIG. 5 with the center medial section broken out to condense the figure;

FIG. 5 is a fragmentary side elevation view of the same general scale as FIG. 4 and showing the support bed, the rolling rack, the star wheel stabilizing and metering unit, and the elevators and related drive means therefor;

FIG. 6 is a fragmentary end elevation on a somewhat larger scale and looking in the direction of the arrows 6—6 in FIG. 5, with the discharge chute indicated in dot-and-dash lines for the sake of clarity;

FIG. 7 is a fragmentary enlarged elevational view illustrating certain drives and the rolling rack means;

FIG. 8 is a transverse cross-sectional view taken substantially on the line 8—8 of FIG. 7;

FIG. 9 is an enlarged side elevational view of the stabilizing star wheel unit showing several positions of certain portions in dot-and-dash lines;

FIG. 10 is a top plan view of the apparatus shown in FIG. 9 but with a medial section broken out for the purpose of condensing the view;

PREFERRED EMBODIMENT

Figure 11:
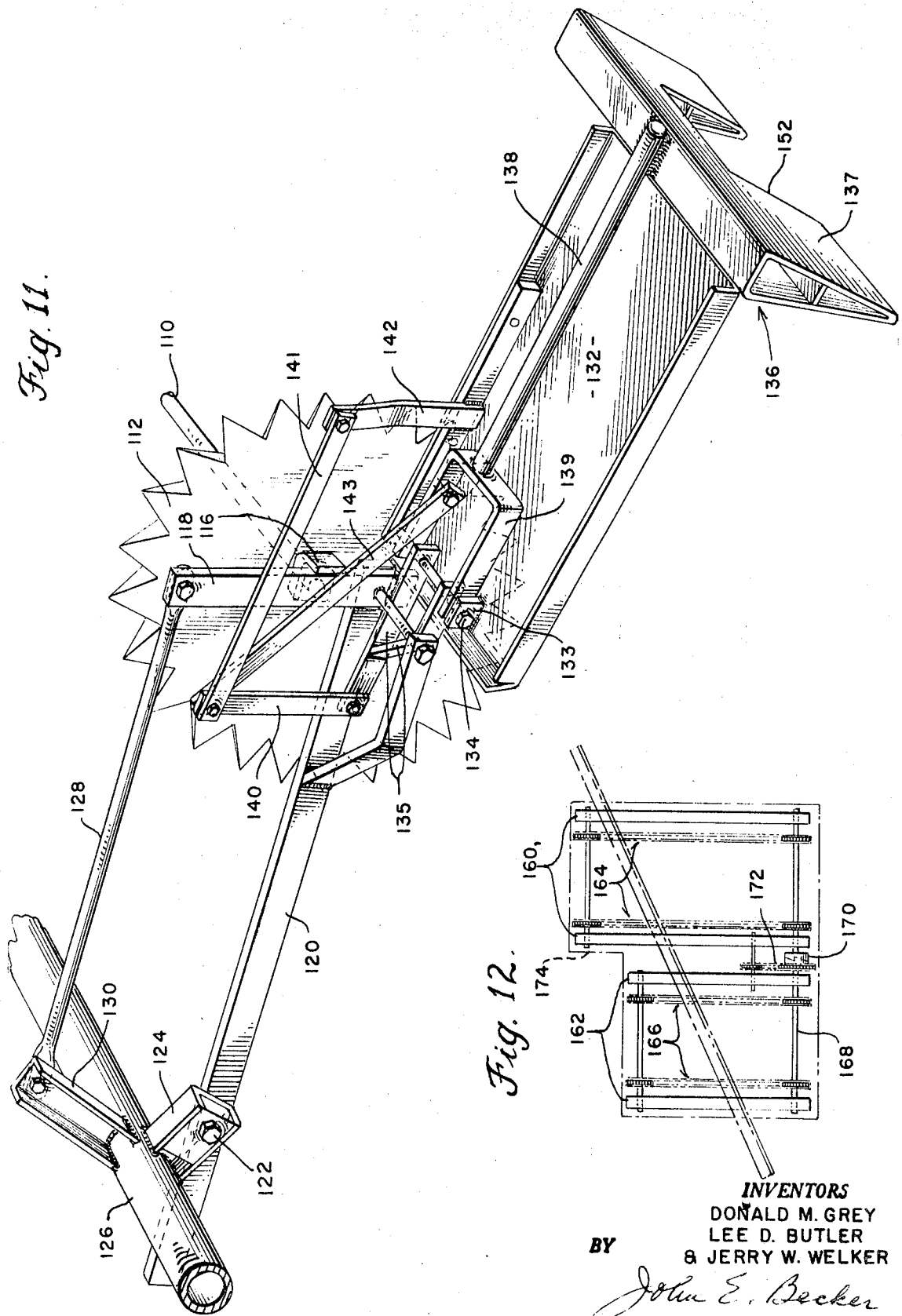
FIG. 11 is an isometric fragmentary view of certain components related to the star wheel metering unit and to the bale retaining gate.

Referring to FIG. 1, the bale wagon is generally of the type disclosed in U.S. Pat. No. 2,848,127 and includes a chassis frame 10 comprising generally longitudinal frame members interconnected by suitable cross bars. The chassis frame is supported adjacent its rearward end by a pair of rear wheels 12. The forward end of the chassis frame is provided with a suitable hitch and bar 14 shown fragmentarily and arranged for connection to a tractor (not shown) having a power take-off fragmentarily indicated at 15.

Mounted at one side of the forward end of the chassis frame is a suitable bale loader unit 16 which may be supported by a laterally directed arm, which is movable about an axis longitudinal of the chassis frame by the action of a suitable hydraulic cylinder, so that the bale loader unit may be moved from the lower operative position such as in FIG. 1, to a raised inoperative position (not shown).

The bales of hay are delivered from the bale loader unit 16 onto a receiving table 18 which extends transversely over the forward end of the chassis frame and is of a width in the fore-and-aft direction corresponding to the width of a bale of hay and of a lateral length equal preferably to two bales of hay. The receiving bed 18 is provided with hydraulic means (not shown) operable to raise the receiving bed from its normal horizontal position to a vertical position to enable the pair of bales to be placed upon the second or transfer bed 20. The transfer bed 20 is equal in respect to the lateral width of the receiving bed but has a longitudinal length equal to preferably four bales of hay so as to support a total of eight bales in two rows of four bales each. The pickup or loader unit 16 and first receiving table 18 are generally of the type shown in U.S. Pat. No. 3,330,424.

One or more hydraulic cylinders 21 (FIG. 1) are connected in a well known manner between the chassis frame and the transfer bed for the purpose of tilting the transfer bed 20 to a vertical position in such a manner that it places or transfers a load of eight bales therefrom onto the forward edge of the load-carrying bed 22. (Refer to Grey U.S. Pat. No. 2,848,127.)

The load-carrying bed comprises a rectangular framework 24 covered by a sheet metal floor 26 (FIGS. 7 and 8) serving as the upper surface of the bed. The bed 22 is provided with a pair of longitudinal slots 28, 28 (FIG. 8) disposed adjacent the longitudinal center line, said slots being bordered on their respective outer margins by channeled tracks 30, 30 constituting additional frame structural members whose flanges partially underlie and overlie the upper surface 26 of the load-carrying bed 22. As the load of eight bales is raised onto the load support bed, the leading stack of bales as a unit is guided thereon by means of side wing-like members 32 and pivotal stabilizing arms 34 (FIGS. 1, 4, and 5) having serrated fingers to releasably engage succesive tiers of baled hay as they are deposited on the bed. The arms 34 serve to retain the bales and to keep them from toppling forward off the wagon during downhill traversal of the loaded wagon.

As the bales are loaded into tiers upon the load-carrying bed, the leading stack of bales engage a spring loaded carriage or rolling rack 36 (FIGS. 4, 5, 7, and 8), which normally rest against stops or buffers 38, at the forward end of the wagon (FIGS. 4 and 5) when not loaded by the bales. The carriage includes a rectilinear frame or bracket generally designated 40 having a cross member 42 (FIGS. 4, 7, and 8) disposed transverse to the longitudinal center line of the wagon and normally at rest closely adjacent the forward end of said wagon. This bracket is of a slightly shorter width than the distance between the outer margins of the dual spaced slots, and is provided at opposite sides with rearwardly extending side members 44 (FIGS. 4, 5, 7, and 8) which terminate rearwardly a distance generally equal to the width of a bale of hay. Attached to the respective ends of said bracket are upwardly extending tine members 46. These spaced apart tines are of sufficient height to form a support for respective stacks of usually four bales each as the total eight bales have been transferred onto the bale carrying bed 22 from the transfer table 20. The carriage 36 is provided with spaced anti-friction means such as suitable rollers 48 disposed at the forward end thereof and in such a manner as to engage the underneath side of the upper flange 50 of the track 30. The carriage, adjacent the ends of the respective side members 44 and generally beneath the respective upright tines 46, is further provided with antifriction rollers 52 which ride within the channel track 30 upon the upper surface of the lower flange 54 thereof. One way in which the carriage or rack may be spring loaded is by a cable 60 anchored to the frame at 62 and passing around a traveling sheave 64 and a longitudinally spaced fixed sheave 66, being anchored to the load-stabilizing rolling rack at 68. The traveling sheave 64 is carried by one end of a heavy duty spring 70, the outer end of which is anchored to the frame as at 72 (FIG. 4).

Referring again to the spaced track members 30, 30, the upper surface or flange 50 of each track member is provided with a laterally extended flange portion 51 throughout its length which overlies the floor 26 of the wagon bed. Suitable longitudinally extended bale conveyors 53 in the form of endless chains having spaced flights or lugs 53' thereon for engaging the bales to move same therealong, are disposed outwardly adjacent each of the dual slot ways. The chains are supported by idler pulleys 55 at the forwardmost end which are mounted on suitable portions of the frame member, and at the rearward end by driving sprockets 56 mounted on a suitable drive shaft 57 supported by the rearward portion of said frame as at 58 (FIGS. 6 and 7). The chain conveyors are disposed in such a manner that the chain rests upon the upper lateral flange 51 of the channeled members 30. Pairs of laterally disposed guide brackets 59 are provided at spaced intervals throughout the length of the conveyor chain track to preclude the chain from being forced off of the track laterally and to preclude the tendency of the chain to run off of the rear driving sprockets 56. The drive shaft 57 for these conveyor chains is provided with a selectively engageable dog clutch 61 mounted on said shaft 57. A driven sprocket 63 (FIG. 6) is also mounted on said shaft 57. Clutch 61 comprises a two part construction including a left jaw 61a and right jaw 61b. Left jaw 61a is unitarily connected with driven sprocket 63 which together with jaw 61a has limited laterally shifting capability to enable clutch jaw engagement. Said sprocket 63 is driven by chain 63' and a driven sprocket 65 mounted on a laterally extending, frame supported, lay shaft 67. Shaft 67 derives its drive by means of chain 69 interconnecting a sprocket 71, also affixed to lay shaft 67, and sprocket 73 mounted on the laterally extending drive shaft 75 projecting from a gear reduction unit 77. Said unit 77 is disposed beneath the bale carrying bed floor 26 and supported at and by a rearward portion of the main chassis frame. The gear reduction unit 77 aforesaid is universally connected by an extended drive shaft 79 with the power take-off drive 15 of the draft or self propelled vehicle.

Connected at the rear extremity of the load-carrying bed 22 at spaced intervals are a series of preferably four upwardly and rearwardly angled combination bale support and unloading elevator chain support members 76. support members 76. Support members 76 may be of any suitable heavy duty construction such as of channel or box formation, and may be adjustably secured to a rearward portion of the support bed frame by means of bolt assemblies 78 and depending bracket members 80 (FIGS. 6 and 7) attached to the rearward ends of structural channel members 30. Laterally extended members 82 impart more rigid stability to the structure by interconnecting the lower portions of the respective right and left pairs of the supports. The upper portion of said spaced suports are laterally stabilized relative to one another by any suitable brace means 84 (FIG. 6) extending transversely of the rearward part of the bale wagon and which preferably adjustably interconnect at an upward portion of and with suitable side support members 86 disposed along the longitudinal marginal edges of the wagon (FIGS. 1 and 2).

A plurality of bale elevating, endless, conveyor chains 88, preferably four in number when utilizing a two bale wide wagon, are disposed on the aforesaid elevator support members 76. The elevator chains are designated in pairs 88, 88 and 88', 88', are rotatively carried at their upper ends by means of drive sprockets 90 attached to elevator drive shaft 89 carried by the upper ends of said supports 76. The lower portions of the elevator chains are supported on idler sprockets 91 carried preferably by individual stub shafts 92 mounted on depending brackets 93 affixed to the supports 76 (FIGS. 6 and 7).

The elevator chains are driven by means of the main PTO shaft means via the aforesaid lay shaft 67, upon which a large drive sprocket 94 is mounted for rotation therewith, and which has a driven chain 95 connecting it with a smaller diameter driven sprocket 96 attached to said drive shaft 89. While driven sprocket 96 is attached, as by a key, for rotation with drive shaft 89, it is noted that sprocket 96 is laterally or axially shiftable a limited amount and is unitarily connected to the left hand jaw 101a of clutch 102 described hereinafter.

Attached to the elevator chains are time or lifting shoe means for engaging bales as they are urged rearwardly into the elevating discharge area. In this respect it will be apparent from viewing FIGS. 1–6 that tines 97, 98 of the first two elevator chains 88, 88 are somewhat advanced in relation to the tines 99 and 100 of the second set of elevator chains 88', 88' as located at the right half of the machine as viewed in FIG. 6. There are two sets of the lifting tines on each elevator chain and spaced apart so that when one set is disposed at the lower ready-to-lift position, as shown in FIGS. 5 and 7, the other set is in the completed, bale-discharging position at the upper end thereof.

The ratio of the gearing and sprockets is such that when the rolling load rack and conveyors advance the bale stacks 18 inches, which is the width of a given stack of bales, the elevator chains make one-half of a revolution, thus moving the elevator tines from the bottom lifting positions to the top discharging positions to effectively discharge the bales of the stack in single fashion by the time the next stack is advanced to the elevators. Thus, in the discharge of the bales as onto a chute to be described, keeping in mind the relative advanced relationship of the respective tines on the respective sets of chain, it is apparent that the first bale is discharged by the tines 97 and 98 of the pair of elevator chains 88, 88 at the left hand side of the machine, and then the next or second bale is discharged by the elevator chains 88', 88' at the right hand side of the machine. The next or third bale is then again discharged by the tines 97 and 98 of chains 88 in an alternating manner as the next bale is discharged by tines 99 and 100 of chains 88'. This alternate sequential discharge of the bale is illustrated in FIGS. 2 and 3 of the drawings.

As the bales are discharged from the elevator conveyors in single bale fashion, the bales are received upon an inclined discharge chute designated 148 having a notched out upper portion 149 to provide for clearance for the lifting tines as they rotate past. The chute is attached in any suitable manner as by arm suport 155 at the top and 156 at the bottom, as shown in FIG. 5.

Referring back to the initial loading of the bale support bed, it is to be noted that as the successive tiers or stacks of bales are laid thereon, the support bed or so-called load rack conveyors 53 are not driven under positive power. However, contact of the lowermost bales of the stack with the conveyor lugs 53' causes the conveyors to move in an idle manner as subsequent stacks are deposited thereon forcing the previously deposited stack or tier rearwardly. After a completed load is achieved (FIGS. 1 and 2) and the wagon has been transported to the desired area for the bales to be discharged, the said conveyors 53 and the normaly idle bale elevators 88, 88' are selectively power driven under the control of their respective separate clutch means 61 on the conveyor drive shaft 57 and clutch means 102 on the upper elevator shaft 89. Clutch 102 similarly comprises jaws 101a and 101b mounted on shaft 89, with jaw 101a being unitarily attached to sprocket 96 and axially shiftable for engagement with jaw 101b. The respective clutches are disengaged as shown clearly in FIG. 6 when the stacks are being loaded onto the bed and when the bale wagon is in transport. Jaw clutch 61 is engaged by means of suitable bell crank linkage designated generally at 61' and operable by handle means 81 as viewed in FIG. 6. Clutch 102 is also shiftable by similar bell crank means designated generally 103 and manually operable by handle 104. Operation of the clutches is available manually by levers at the rear end of the wagon, or they may be operated in a semi-automatic manner by means of a pull cable 105 attached to the lower end of handle 104 or by a cable 106 attached to the clutch lever of clutch 61, it being contemplated that said cables can be integrated and attached to a common actuating lever for the operator on the vehicle.

Suitable known means, for example indent devices 107 (FIG. 6), are provided to prevent unintentional engagement of the clutches, and may also be used to retain the clutches in the engaged position when so desired. In the unloading operations, the clutch 61 is first engaged to power drive the load of bales by means of the rack conveyor toward the rearwardmost portion of the wagon preparatory to unloading thereof. Then the clutch 102 is engaged to power drive the elevator chains.

During the rearward conveying of the stacks of hay it has been found preferable to stabilize the stacks by means of a stabilizing and metering star wheel unit designated generally at 108. While the unit 108 as shown and to be described is disposed generally atop the wagon and intended to coact with the upper surface of the bale stack, it is contemplated that the metering wheel unit can be disposed to coact with the upper lateral sides of the bale stack, to assure an equally uniform and positive transfer of the tiers to the discharge area. Said unit 108 comprises a shaft 110 having a pair of laterally spaced star wheels 112, 112. The shaft 110 is mounted in bearings 114, 114 carried by respective brackets 116, 116 attached to the respective upright arms 118, 118, said arms being rigidly connected to generally horizontally extended arms 120, 120 pivoted at 122 on the respective brackets 124 rigidly connected in a generally depending manner from a transverse support bar 126. Horizontal bar 126 is secured to the ends of the upright side support members 128 of the load supporting wagon (FIGS. 1 and 5). A rod 128 disposed parallel to arms 120 interconnects the upper portion of the relatively rigid upright arm 118 and a generally upright rigid bracket 130 which also is attached to the transverse support bar 126. As better seen in FIGS. 4 and 10, two identical, laterally spaced star wheel assemblies are laterally spaced in such a manner that the individual star wheels 112, 112 preferably lie approximately above the load rack conveyors and are adapted to engage the respective rows of bales, as the bales are conveyed therebeneath.

The star wheels 112 are driven by the aforedescribed conveyor shaft 57 provided at its outer end with a driven pulley 111 attached thereto. A drive shaft 113 (FIG. 10) is rotatably mounted in parallel fashion to support bar 126 as by suitable brackets 115, 115. A sheave 117 of substantially the same diameter of sheave or pulley 111 is attached on the outermost end for rotation with shaft 113. At its inner end, the shaft 113 is provided with a drive sprocket 119. A drive belt 121 is disposed in a twisted manner about sheaves 111 and 117 so as to effect a reverse drive of the shaft 113 with respect to shaft 57 and ultimately of the star wheels 112 so that the star wheels will meter the bales of hay in the appropriate manner. The relative ratios of the drive pulleys and diameter of the star wheels is such that one full rotation of the star wheel helps move the bales a distance corresponding to one bale width or about 18″ and is in timed relationship with the bale conveyor chains 53, 53. A driven sprocket 123 is secured to star wheel shaft 110, and a drive chain 125 drivingly interconnects the sprockets 119 and 123 to effect suitable rotation of the star wheels 112.

Associated with the star wheel metering unit are a pair of combined bale hold down and gate means, with each of said means being disposed adjacent each of the respective star wheels 112. To simplify the description and because they both operate in a similar manner, only one of the units will be described.

A combined bale retaining-deflecting hold down gate panel assembly 132 is pivotally mounted at 133 by means of a rod 134 and a yoke 135. The yoke 135 is attached in a rigid manner to the upright arm 118, see FIGS. 9, 10, and 11. Overlying the panel assembly 132 and pivotally connected to the same rod 134 is a retaining gate designated generally at 136. The gate 136 comprises a downwardly extending gate panel 137 supported by a generally horizontally extended pipe or rod arm 138 overlying the panel assembly 132, said rod 138 terminating in a yoke member 139 pivotally attached to said rod 134. When the bale wagon is not fully loaded in the area of the star wheel metering unit, it is understood that said unit will bodily project downward a few inches from the position shown in FIG. 9, being limited by the engagement of the end of arms 120 as they engage the underside of transverse pipe 126. During loading the bales onto the support bed when the leading stack or tier of bales reaches the star wheel unit, the unit is bodily raised these few inches by engagement with the bales and the teeth of the star wheel 112 dig into the bales approximately 1 inch in depth. The star wheels then serve to support the gate assemblies 132 in a downwardly inclined manner as shown in FIG. 9 until engaged by the progressive rearward movement of the bales, to be described.

Parallel linkage for actuating the gate comprises an upright arm 140 pivotally interconnected with the rearward end of bar 135 and an upper link 141, said link 141 being disposed generally parallel to the rod 138 and the support arm 135. Link 141 is, in turn, pivotally interconnected with another upright arm 142, the lower end of which is welded or fixedly connected in a nonpivotal manner to the panel 132. A diagonal link 143 pivotally connects the yoke 139 of the stop gate 137 to the adjacently joined links 140 and 141. These connections are freely pivotal so that when the leading bale stack (FIG. 9) arrives approximately at the line designated 150, contact is made with the panel 132 and as the stacks advance to the position indicated at 150a, the panel 132 is forced upward and the stop gate 137 commences to swing upward at a faster rate to the position indicated by the single dot-and-dash lines, 132a and 137a respectively. It is to be noted, however, that in this position the bale stack is not yet commenced to be raised by the tines or lifting shoes of the elevator chains, and although the stop gate 137 has moved upward somewhat, it is still in engagement with the stack to retain and prevent it from toppling rearwardly. Next, the elevator lifting shoes or tines commence to raise the stack or tier of bales, and the panel 132 then is raised further as is also the stop gate 137, the latter of which raises at a much faster rate than the panel 132, due to the novel linkage relationship thus allowing the stack or tier of bales to topple responsive to being deflected rearwardly, the bales being deflected in the rearward direction by engagement with the panel 132 when in its upwardly inclined position, indicated at 132b, to provide for positive separation of the successively discharging tiers whereby the bales of the tier being discharged are not interferingly engaged with or by those of the next adjacent tier. FIG. 9 also shows that the panel and stop gate reach their respective clearance positions as indicated by a double dot-and-dash line and by the reference numerals having the suffix b applied thereto.

Referring again to FIGS. 7 and 8, the rack 36 is shown partly in full view by solid lines, and by dotted lines where it is hidden behind certain other structure; and, in this condition it is approaching the position where it will be forced into a rearwardly retracted condition by the progressive movement of the bale stacks thereagainst. This retracted position is shown in dot-and-dash lines in FIG. 7 and with the upward projecting tines 46 assuming a nested or recessed position between the upright support members 76. More specifically, it will be seen that as the rack progresses rearwardly the wheels 52 approach a drop off of the lower track 54 as indicated at 145 (FIG. 7). Attached at this point and extending in a downwardly and reversely inclined condition is a bar-track member constituting a cam way 146, said cam member 146 being angularly returned upward and forwardly for attachment to the underside of channel track at the point 147 (FIG. 7). Accordingly, the rolling rack 36 is cam-retracted to a position of noninterference with the bales at the elevator area during the discharging or unloading condition.

It is to be noted that the bale-retaining gates 137 are provided with rectangular notched areas 170 to permit passage of the upper ends of the upright tine members 46 of the rolling rack 36 as it is progressively forced rearwardly and passes into its retracted position.

After a complete unloading of the wagon has been achieved, and the rolling rack 36 is to be repositioned for commencement of again loading the bales thereagainst, it is only necessary for the operator or an assistant to manually push slightly upwardly against the rolling rack from the rear whereby the wheels thereof ride up the inclined cam way 146 and when they get over the top of the lower flange of the channel track, the resiliency of the spring 70 instantly draws the rolling rack to its forwardmost position whereupon it is ready again to receive the bales and to repeat the cycle already described.

Figure 12:
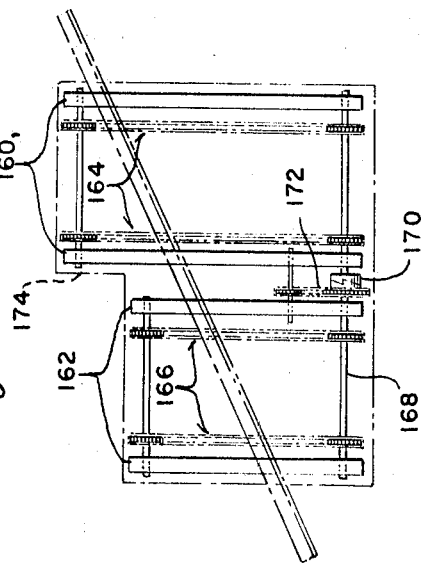
FIG. 12 is a diagrammatic view of an alternate single bale unloading means.

Referring to FIG. 12, there is schematically depicted a generally rear elevation view of an alternate means for achieving single bale unloading of the tiers. In this embodiment, only the modified structure will be described, it being understood that the balance of the construction and operation thereof remains generally the same as the first described embodiment.

The structure as viewed in FIG. 12 comprises preferably a pair of tall upright supports 160, 160 at the right hand side which corresponds to the right hand pair of supports 76 in the first embodiment. Also it includes a pair of somewhat shorter supports 162, 162 at the left hand side of the wagon. Said supports are rigidly attached in a manner similar to that described for supports 76. By utilizing similar bale elevator chain assemblies of corresponding height with each set of the supports 160 and 162, said chain assemblies being designated generally at 164 and 166 respectively, it is apparent that the elevator chains thereof will lift the bales when received thereagainst in the same manner as previously described. The lower drive sprockets for the chain elevators preferably are all axially aligned across the lower rear portion of the wagon, while those at the upper ends of the respective pairs are staggered, one pair being higher than the other. Because of the staggered upper terminal limits thereof, it is apparent that the bales on the left will discharge earlier than those on the right, assuming that the sprocket sizes, ratios and relative speeds are correctly synchronized and the lifting flights on the respective chain assemblies are attached in correlated relationship as is intended. The amount of staggered relationship of the upper ends of the elevator chain assemblies preferably is approximately one half the thickness or depth of a given bale.

Due to the staggered upper limits, the elevator chain assemblies are preferably driven at their lower ends by a common drive shaft 168, but in a manner similar to that described for the upper located drive shaft 89 of the first embodiment. It is contemplated that the respective pairs of drive sprockets may vary relative to one another or embody the use or lay idlers, and/or the drive shaft may have a suitable speed change unit interposed between the respective pairs of drive sprockets if desired to facilitate proper drive ratios to effect desired alternate discharge timing of the bales. The same general type of clutch assembly designated 170 may be used and would correspond to that clutch 102 in the foregoing. A much shorter but similar suitable drive chain assembly 172 would be used in a manner corresponding to that designated 95 of the first embodiment. It is also contemplated that baffle means designated schematically at 174 may be utilized to suitably shield the elevator and drive assemblies from the debris of fragmented stalks or hay encountered during such operations. Similar baffle means may be applied to the first described construction.

It is apparent from the foregoing description that a novel single bale unloading wagon has been evolved which achieves all the objectives and advantages as set forth in the preamble and throughout the specification. Even though this invention has been described primarily in relation to a self-loading wagon, it is understood that the subject unloading device can be used with any kind of wagon irrespective of how it is loaded. It is to be further understood that the wagon could be provided with skids in lieu of wheels.

While this invention has been described in connection with a particular embodiment, it will be understood that it is capable of modification and that this application is intended to cover any variations, uses, or adaptations following, in general, the principles of the invention and including such departures from the present disclosure as come within the known or customary practice in the art to which the invention pertains and as fall within the scope of the invention.

What is claimed is:
1. A bale wagon for loading and unloading hay bales comprising in combination:
  (a) a mobile frame structure having a generally flat, support bed, one end of which constitutes a discharge station;
  (b) means on said frame and bed for receiving and moving uniformly vertically stacked tiers, having a plurality of rows, in a fore-and-aft direction therealong to said discharge station; and
  (c) discharge means on one end of said bed for receiving successive tiers of bales and for unloading bales from the wagon one bale at a time, said discharge means comprising means for separating the bale tier nearest said discharge means from the remaining bale tiers on said bed, means for separating a row of bales from said tier being unloaded and means for unloading said separated bale rows from the wagon one bale at a time.

2. A bale wagon as defined in claim 1, wherein the support bed includes bale stabilizing movable rack means mounted on said wagon frame and yieldable rearwardly responsive to loading pressure attendant progressive receiving of successive tiers of bales thereagainst.

3. A bale wagon as defined in claim 1, wherein the means for moving the stacked tiers in a fore-and-aft manner include laterally spaced conveyor means disposed for operable engagement with the tiers and operable throughout the length of said wagon and stacked tiers.

4. A bale wagon as defined in claim 1, further including combined overhead bale retaining and metering means.

5. A bale wagon as defined in claim 4, wherein the metering means includes a pair of bale metering wheel means which drivingly control the action of the tiers as they are progressively moved along the bed support toward the discharge station.

6. A bale wagon as defined in claim 1, wherein the discharge means for unloading includes conveyor means to receive and elevate said bales, including staggered means in association therewith to unload the bales in relatively staggered relation.

7. A bale wagon as defined in claim 6, wherein the conveyor means includes a plurality of endless conveyors disposed to receive stacks of bales, and having alternately staggered lifting flights attached to said conveyors for sequentially engaging and lifting the bales in a staggered or offset manner.

8. A bale wagon as defined in claim 6, wherein the conveyor means includes a plurality of bale elevating means some of which terminate in staggered discharge relationship to effect unloading of the bales one bale at a time.

9. A bale wagon as defined in claim 6, wherein the discharge means for unloading said bales one bale at a time comprises inclined, staggered, support means disposed to receive successive tiers at an inclined angle relative to that of other tiers on said wagon.

10. A bale wagon as defined in claim 6, wherein the conveyor means terminates in staggered discharge relationship, and slide means on said wagon for receiving the bales from said lifting means and for laterally directing the bales from said wagon.

11. A bale wagon as defined in claim 1, wherein the means for separating the bale tiers includes support members inclined away from one end of the wagon at an angle different from the angle formed by the tiers relative to the wagon, with the discharged bales being spaced from adjacent tiers on the wagon bed.

12. A bale loading and unloading vehicle adapted to travel over a bale strewn field comprising in combination:
  (a) a mobile frame structure having a generally flat support bed for carrying bales thereon;
  (b) a bale pick-up means on said wagon;
  (c) means on one end of said wagon for receiving bales from said pick-up means to form them into vertically extending tiers;
  (d) means on said wagon for moving said tiers in a fore-and-aft direction along said bed, said means including a movable bale stabilizing rack means mounted on said wagon frame and yieldable rearwardly in response to pressure of succesively formed tiers; and (e) discharge means on the other end of said wagon for receiving successive tiers and for unloading the bales of the tiers one bale at a time, said unloading means comprising conveyor means to receive and elevate said bales, including staggered means in association therewith to unload the bales in relatively staggered relation one bale at a time.

13. A bale wagon as defined in claim 12, wherein the means for moving the stacked bales in a fore-and-aft manner includes:

(a) laterally spaced conveyor means operable throughout the length of said wagon and said stacked bales; and (b) bale metering wheel means which stabilize and supplementally control the action of the tiers as they progressively move along the bed support to the discharge station.

14. A bale wagon for loading and unloading hay bales comprising, in combination:

(a) a mobile frame structure having a generally flat, support bed, one end of which constitutes a discharge station;

(b) means on said frame and bed for receiving and moving uniformly vertically stacked tiers, having a plurality of rows, toward said discharge station; and (c) discharge means on one end of said bed for receiving successive tiers of bales and for unloading bales from the wagon one bale at a time, said discharge means including means for separating the bale tier nearest said discharge means from the remaining bale tiers on said bed.

15. A bale wagon as defined in claim 14 wherein said discharge means further includes means for separating a row of bales from said tier being unloaded and means for unloading said row of bales from the wagon one bale at a time.

16. A bale wagon as defined in claim 15, wherein said means for separating a row of bales from said tier being unloaded comprises elevating means having staggered means associated therewith for unloading said bales from said rows in staggered relation.

17. A bale wagon as defined in claim 15, wherein said unloading means comprises slide means for unloading bales from the wagon one bale at a time.

References Cited
UNITED STATES PATENTS

| | | | |
|---|---|---|---|
| 1,341,239 | 5/1920 | Mason | 214—519 |
| 2,815,874 | 12/1957 | Kowal | 214—44 |
| 3,214,050 | 10/1965 | McConeghy | 214—519 |
| 3,278,050 | 10/1966 | Tarbox | 214—6 |

GERALD M. FORLENZA, Primary Examiner

G. F. ABRAHAM, Assistant Examiner

U.S. Cl. X.R.

214—8.5, 519